United States Patent
Bessonov et al.

(10) Patent No.: US 11,966,917 B2
(45) Date of Patent: Apr. 23, 2024

(54) SYSTEMS AND METHODS FOR PROVIDING PERSONAL REWARDS IN A TRUSTLESS ECOSYSTEM

(71) Applicant: BITCLAVE PTE. LTD., Trivex (SG)

(72) Inventors: Alexander Bessonov, San Jose, CA (US); Patrick Tague, Mountain View, CA (US); Mark Shwartzman, Campbell, CA (US); Stephen Winston, San Jose, CA (US); Vadim Gore, Beaverton, OR (US)

(73) Assignee: Bitclave Pte. Ltd., Trivex (SG)

( * ) Notice: Subject to any disclaimer, the term of this patent is extended or adjusted under 35 U.S.C. 154(b) by 862 days.

(21) Appl. No.: 16/568,115

(22) Filed: Sep. 11, 2019

(65) Prior Publication Data

US 2020/0082393 A1 Mar. 12, 2020

Related U.S. Application Data

(60) Provisional application No. 62/730,440, filed on Sep. 12, 2018.

(51) Int. Cl.
  *G06Q 20/38*    (2012.01)
  *G06F 16/23*    (2019.01)
  *H04L 9/00*     (2022.01)

(52) U.S. Cl.
  CPC ....... *G06Q 20/389* (2013.01); *G06F 16/2365* (2019.01); *G06F 16/2379* (2019.01);
  (Continued)

(58) Field of Classification Search
  USPC ........................................................ 705/71
  See application file for complete search history.

(56) References Cited

U.S. PATENT DOCUMENTS 5,892,900 A * 4/1999 Ginter .................... G06Q 20/06
                                                         726/26
11,188,907 B1 * 11/2021 Vijayvergia ......... G06Q 20/023
(Continued)

FOREIGN PATENT DOCUMENTS

CN    107403303 A  *  11/2017  ....... G06Q 20/38215

OTHER PUBLICATIONS

S. Bragagnolo, H. Rocha, M. Denker and S. Ducasse, "SmartInspect: solidity smart contract inspector," 2018 International Workshop on Blockchain Oriented Software Engineering (IWBOSE), 2018, pp. 9-18, doi: 10.1109/IWBOSE.2018.8327566. (Year: 2018).*
(Continued)

*Primary Examiner* — Jacob C. Coppola
*Assistant Examiner* — Eduardo Castilho
(74) *Attorney, Agent, or Firm* — LOZA & LOZA, LLP

(57) ABSTRACT

Methods and systems relating to a protocol for verification and enforcement of proper payment of a reward from a business (second entity) to a user (first entity) are shown. A reward can be earned by the user storing private information as encrypted data on the block chain or in a data store, such as IPFS, accessible by the business. Smart contracts running on a block chain operate to implement portions of the protocol while a local block chain node can run smart contracts in read-only mode to avoid placing private information, such as decryption keys, on the block chain. The protocol can be implementable over public storage and all artifacts of the protocol can be used later as proofs of proper behavior. The protocol defines incentives and penalties to motivate every player to act according to the rules, hence making the methods and systems operate as expected.

18 Claims, 11 Drawing Sheets

(52) U.S. Cl.
CPC ..... *G06Q 20/3829* (2013.01); *G06Q 2220/00* (2013.01); *H04L 9/50* (2022.05)

(56) References Cited

U.S. PATENT DOCUMENTS

| | | | |
|---|---|---|---|
| 11,295,359 B1* | 4/2022 | Mullins | G06Q 20/202 |
| 2017/0109748 A1* | 4/2017 | Kote | G06Q 20/382 |
| 2017/0187535 A1* | 6/2017 | Middleton | G06Q 20/065 |
| 2017/0352027 A1* | 12/2017 | Zhang | G06Q 20/065 |
| 2017/0353309 A1* | 12/2017 | Gray | G06Q 20/3829 |
| 2017/0372300 A1* | 12/2017 | Dunlevy | G06Q 20/36 |
| 2018/0018723 A1* | 1/2018 | Nagla | G06Q 20/4014 |
| 2018/0047111 A1* | 2/2018 | Vieira | G06Q 40/08 |
| 2018/0123779 A1* | 5/2018 | Zhang | G06Q 20/02 |
| 2018/0315047 A1* | 11/2018 | Kennedy | G06Q 20/24 |
| 2018/0365201 A1* | 12/2018 | Hunn | G06F 40/134 |
| 2018/0365686 A1* | 12/2018 | Kondo | G06Q 20/382 |
| 2019/0205844 A1* | 7/2019 | Nuzzi | G06Q 20/3829 |
| 2019/0237169 A1* | 8/2019 | Culver | G06Q 20/223 |
| 2019/0279206 A1* | 9/2019 | Song | G06F 16/1805 |
| 2019/0301883 A1* | 10/2019 | Xia | G06Q 30/02 |
| 2020/0005388 A1* | 1/2020 | Lim | G06Q 30/0645 |
| 2020/0042361 A1* | 2/2020 | Clark | H04L 9/50 |
| 2020/0051041 A1* | 2/2020 | Ko | G06Q 20/3829 |
| 2020/0074458 A1* | 3/2020 | Govindarajan | G06Q 20/382 |
| 2020/0235947 A1* | 7/2020 | Baykaner | G06Q 20/02 |
| 2020/0372505 A1* | 11/2020 | Turgman | G06Q 20/0658 |
| 2021/0326992 A1* | 10/2021 | Leise | G06Q 40/08 |
| 2022/0038264 A1* | 2/2022 | Yakira | H04L 63/0442 |

OTHER PUBLICATIONS

Araoz, "The Hitchhiker's Guide to Smart Contracts in Ethereum," retrieved from https://web.archive.org/web/20170520031222/https://medium.com/zeppelin-blog/the-hitchhikers-guide-to-smart-contracts-in-ethereum-848f08001f05 on May 20, 2017 (Year: 2017).*

Vasa, "Difference Between SideChains and State Channels," retrieved on Jun. 26, 2018 from https://web.archive.org/web/20180626110141/https://hackernoon.com/difference-between-sidechains-and-state-channels-2f5dfbd10707 (Year: 2018).*

J. Eberhardt and S. Tai, "ZoKrates - Scalable Privacy-Preserving Off-Chain Computations," 2018 IEEE International Conference on Internet of Things (iThings) and IEEE Green Computing and Communications (GreenCom) and IEEE Cyber, Physical and Social Computing (CPSCom) and IEEE Smart Data (SmartData) (Year: 2018).*

E. Wagner, A. Völker, F. Fuhrmann, R. Matzutt and K. Wehrle, "Dispute Resolution for Smart Contract-based Two-Party Protocols," 2019 IEEE International Conference on Blockchain and Cryptocurrency (ICBC), Seoul, Korea (South), May 2019, pp. 422-430, doi: 10.1109/BLOC.2019.8751312. (Year: 2019).*

* cited by examiner

SYSTEMS AND METHODS FOR PROVIDING PERSONAL REWARDS IN A TRUSTLESS ECOSYSTEM

CROSS REFERENCE TO RELATED APPLICATIONS

This patent application and claims the priority and benefit of U.S. provisional patent application No. 62/730,440, entitled "Secure protocol for personal reward in trustless ecosystem," filed on Sep. 12, 2018, which is herein incorporated by reference in its entirety.

TECHNICAL FIELD

The embodiments herein relate to public key encryption, cryptographic digital signatures, block chains, encrypted data storage, and, more particularly, to providing rewards in a trustless ecosystem.

BACKGROUND

Block chain technology began receiving wide interest in 2008 with the popularization of the bitcoin cryptocurrency. Since then, a number of different block chain technologies have been deployed. In general, a block chain is a continuously growing list of records, called blocks, which are linked and secured using cryptography. By design, a block chain is inherently resistant to modification of the data stored in the blocks. Block chains are often described as open, distributed ledgers recording transactions in a verifiable and permanent way. This description is true for many block chains although private block chains and hybrid public/private block chains have been deployed. For use as a distributed ledger, a block chain is typically managed by a peer-to-peer network collectively adhering to a protocol for inter-node communication and validating new blocks. Once recorded, the data in any given block cannot be altered retroactively without the alteration of all subsequent blocks, which requires collusion of the network majority.

Block chains can, as part of their specification, store and execute smart contracts. A transaction on the block chain can store a smart contract on the block chain. Another transaction can cause methods or subroutines within the smart contract to be executed, often writing data onto the block chain.

BRIEF SUMMARY

It is an aspect of the embodiments that a method for providing personal rewards in a trustless system can include storing a validator smart contract (VSC) on a block chain maintained by a plurality of network nodes. A validator can store the VSC on the block chain. An executor smart contract (ESC) is also stored on the block chain. The validator can store the ESC on the block chain.

Another aspect of the embodiments is running the VSC in read-only mode on a local block chain node. This approach provides a scheme for a completely reproducible and deterministic compute environment. If the validator is malicious, it can be proven that its computations are wrong and the validator can be punished. Running the VSC in read-only mode prevents input data and calculations from being written to the block chain or otherwise revealed. A local block chain node can be used such that a different, perhaps untrusted, block chain node does not have an opportunity to steal input data or calculations based on the input data. As such, the validator can access the VSC on a local block chain node to run a "Validate Challenge" method or subroutine in read-only mode to thereby not write input variables, such as a decryption key, to the block chain. The decryption key and whatever it can decrypt is thereby kept private.

Yet another aspect of the embodiments is resolving a dispute between a first entity and a second entity in response to the first entity paying a challenge fee to the VSC, the dispute regarding a reward offered by the second entity to the first entity. The first entity may have accepted an offer to receive the reward in return for supplying data to the second entity.

The validator, before resolving the dispute, can be approved by the first entity and the second entity for resolving disputes. The ESC, running on the block chain, can record the approvals. The first entity can access the ESC to approve the validator for resolving disputes and can pay a first deposit to the ESC. The second entity can access the ESC to approve the validator for resolving disputes and can pay a second deposit to the ESC. The deposits may be required for paying challenge fees, rewards, fines, and other fees.

To support its challenge, the first entity can provide proof of earning the reward. When the first entity provides data to the second entity to thereby earn the reward, the first entity can prove it has earned the reward by proving it has shared the data with the second entity. The proof of earning the reward can be provided when the first entity supplies the proof to the VSC that the data has been provided to the second entity.

The VSC or the validator can request proof from the second entity that the reward has been paid, with the proof needed before a deadline expires. If, before the deadline expires, the VSC receives proof that the reward was paid, then the VSC can record, on the block chain, that the dispute is resolved. After expiration of the deadline, wherein the deadline expires before the VSC receives proof that the reward was paid, the VSC can record a proof of no payment on the block chain. By recording the proof of no payment on the block chain, the VSC can provide the proof of no payment to the first entity. The ESC can pay the reward to the first entity from the second deposit in response to receiving the signed proof of no payment. The validator can cryptographically sign the proof of no payment such that the ESC cryptographically verifies the proof of no payment.

The dispute can occur because the first entity believes the second entity paid the wrong amount as the reward. When the reward is for data, the first entity can encrypt the data and submit it to the VSC. The first entity can also encrypt a decryption key thereafter providing the encrypted decryption key to the VSC. The encrypted data can be considered submitted to the VSC when the actual encrypted data is provided or when the VSC receives information for otherwise accessing the encrypted data using a location indicator or some other technique for accessing the encrypted data. The location indicator can point to a storage on the block chain or to some other open storage accessible by all involved parties (example IPFS, where the pointer is based on hash of the data, guarantying the data is authentic). The IPFS (Interplanetary File System) is a well-known protocol and network designed to create a content-addressable, peer-to-peer method of storing data. The validator can resolve the dispute when the second entity pays the wrong amount. After receiving the encrypted decryption key, the validator can calculate the decryption key and use the decryption key to validate the first entities challenge. Validating the challenge can include using the decryption key to access the data on the local block chain node and in read only mode, computing an expected reward; and providing a validation to the first entity. The VSC, running in read-only mode on the local block chain node can validate the challenge. The validation can indicate the expected reward. In response to receiving the validation, the executor smart contract can pay the first entity from the second deposit. The validator can cryptographically sign the validation such that the ESC can cryptographically verify the validation.

A further aspect of the embodiments can be paying a validator's deposit to the executor smart contract. Resolving the dispute can occur when the executor smart contract resolves the dispute by paying the validator's deposit to the first entity if a resolution deadline expires before the validator resolves the dispute in some other manner. The first entity can provide proof of a challenge time to the ESC. Before making a payment to the first entity, the ESC can confirm that the dispute has not been resolved and that the resolution deadline has expired. The ESC's logic can decide not to make a payment to the first entity when the dispute is already resolved or if the resolution deadline has not expired. The ESC should mark the dispute resolved when the dispute is resolved by the ESC making a payment to the first entity.

If the second entity's offer is to pay the first entity the reward in exchange for data, then the first entity can provide the data by storing it as encrypted data on the block chain or in a data store that can be accessed by the second entity. The second entity will be unable to decrypt the encrypted data until provided with a decryption key.

Non-transitory computer readable media can store data and computer readable instructions. A computer readable medium storing computer readable instructions that can be executed on one or more processors may implement methods for providing personal rewards in a trustless system.

BRIEF DESCRIPTION OF THE FIGURES

The embodiments herein will be better understood from the following detailed description with reference to the drawings, in which.

DETAILED DESCRIPTION OF EMBODIMENTS

Figure 1:
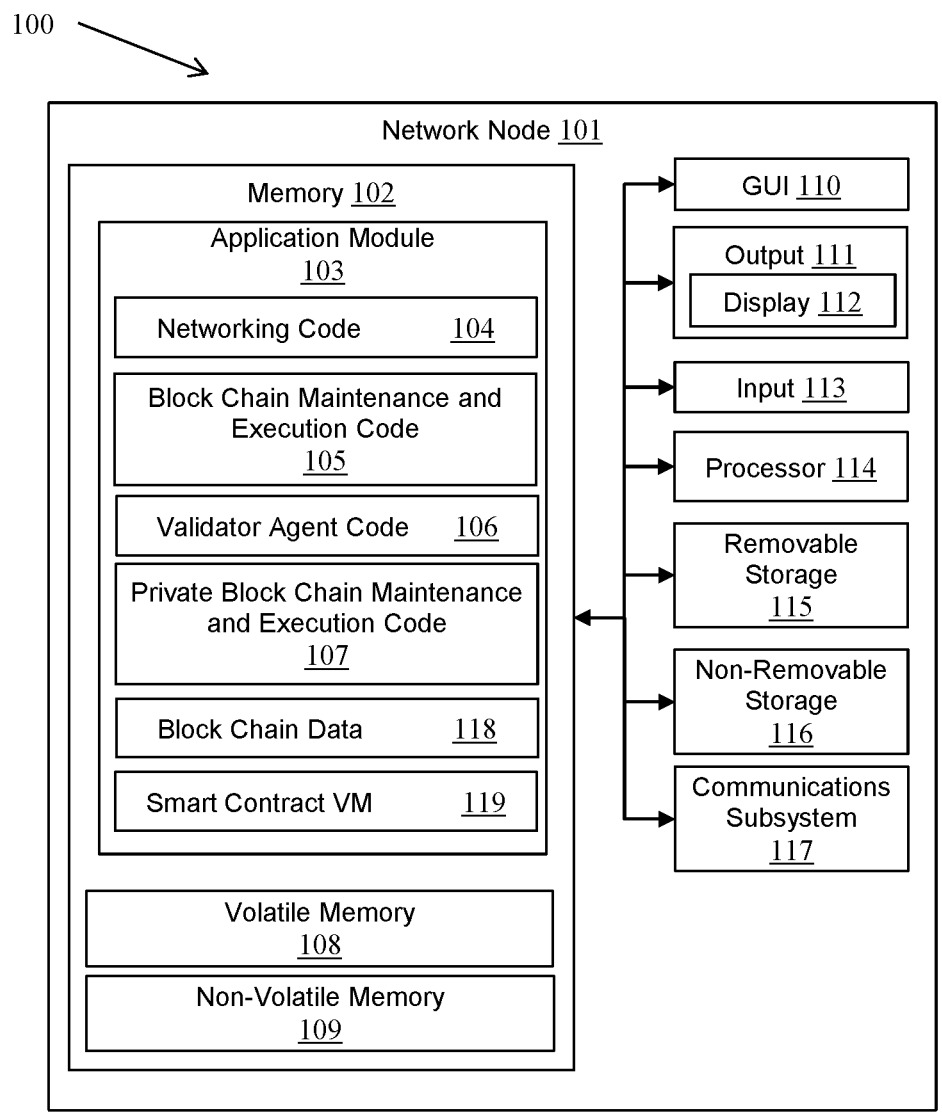
FIG. 1 is a high-level block diagram of a network node that can run smart contracts in read only mode, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose systems and methods for providing personal rewards in a trustless system. The embodiments can be realized on the currently deployed block chains supporting smart contracts such as BASE, Bitcoin, Ethereum, Steller, etc. BASE (BitClave Active Search Ecosystem) is a platform that allows people to store data and enable it for a specific use. In BASE there are two key actors: users and businesses. Users can build their digital persona profile in a way that directly specifies their preferences and interests. This profile is kept encrypted and no one, including BASE, can access it without the user's explicit permission. Businesses can market directly to relevant and motivated users, who match their target audience. If users agree to reveal their profile to a business then they can get compensated. The value is being transitioned directly from advertiser to user and not into the pocket of the middleman. In the context of the embodiments described herein, the first entity can be a user and the second entity can be a business. The business (second entity) can offer the user (first entity) a reward for data (the user's personal information).

BASE relies on block chain for storage and management of data related to customer activities in the search ecosystem. Data can be stored in off-chain open storage like IPFS where only the hash of the data is stored on the blockchain. These activities are created by software endpoints operated by either the customers themselves or by the retailers they interact with. As such, various forms of software applications including retail websites and marketing dashboards can read to and write from the block chain. As the BASE ecosystem is decentralized and open, anyone can create such software that interacts with the customer and publish their data to the block chain. Of particular note, user-facing software has the capability to anonymize information contributed to the block chain, creating what is referred to as the anonymous activity ledger. Activity anonymization is done in a way that allows only authorized parties to attribute multiple activities to the same customer. For all other parties, the data is not attributable to specific individuals (or linkable beyond certain lengths of times) while remaining valuable for statistical and data aggregation purposes. This gives the customer control over what data is allowed to be created, shared, and accessed, all managed and enforced through the use of block chain and smart contracts.

At a high level, anonymity can be achieved by allowing a single user to post to the BASE activity ledger using a variety of unrelated pseudonyms, or alternate identities. The use of multiple identities is already supported in many block chain platforms, as any customer can create an arbitrary number of accounts, wallets, or public key identifiers; this is already common in cryptocurrency platforms like Bitcoin. There are several reasons, beyond privacy, that a user may want to do this. For example, suppose that a user uses BASE while shopping for business needs and also for personal needs. If both of these tasks are performed using the same identity, as is typically done today through monolithic ad networks, both of these roles are combined into a single "customer profile", so the user will be shown ads that relate to both their business and personal lives. If, however, a user could create two separate personas, based on different pseudonymous identities, the search activities could be effectively isolated from each other, allowing the user to separate the ads they see based on their current role. While the different pseudonyms approach solves customer concerns with regards to anonymization, it introduces a challenge for businesses as now they need to have a way to know that two different pseudonyms asking for a service actually belong to the same person, to prevent paying out a reward twice.

In a more general sense, user-facing software can support the use of multiple pseudonyms for a user's search activities, either in support of multiple personas as above, or to truly anonymize the user's search with a different pseudonym for each activity contributed to the ledger. Even in this case, BASE supports the ability to later allow the user to selectively reveal information about these anonymous posts. Specifically, metadata can be included in the activity's fields that can later be used to reveal the true identity of the user or to reveal links between different pseudonyms (even without exposing the user's true identity), noting that both of these can be allowed selectively to only a specific list of authorized parties.

In BASE and other systems having smart contracts on a block chain, some behaviors cannot be implemented in smart contracts, because some decisions are based on accessing encrypted data. Generally, a smart contract should not be used to decrypt data because such decryption would require posting a decryption key to the block chain, thereby making the decryption key available to everyone.

The methods and systems described herein relate to a protocol for verification and enforcement of proper payment of a reward from a business (second entity) to a user (first entity). The protocol can be implementable over public storage and all artifacts of the protocol can be used later as proofs of proper behavior. The protocol defines incentives and penalties to motivate every player to act according to the rules, hence making the methods and systems operate as expected.

Referring now to the drawings where similar reference characters may denote corresponding features consistently throughout the figures, there are shown embodiments.

FIG. 1 is a high-level block diagram 100 of a network node 101 that can run smart contracts in read only mode, according to embodiments disclosed herein. A computing device in the form of a computer 101 configured to interface with controllers, peripheral devices, and other elements disclosed herein may include one or more processing units 114, memory 102, removable storage 115, and non-removable storage 116. Memory 102 may include volatile memory 108 and non-volatile memory 109. Network node 101 may include or have access to a computing environment that includes a variety of transitory and non-transitory computer-readable media such as volatile memory 108 and non-volatile memory 109, removable storage 115 and non-removable storage 116. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Network node 101 may include, or have access to, a computing environment that includes input 113, output 111, and a communications subsystem 117. The network node 101 may operate in a networked environment using a communications subsystem 117 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 111 is most commonly provided as a computer monitor, but may include any output device. Output 111 and/or input 113 may include a data collection apparatus associated with network node 101. In addition, input 113, which commonly includes a computer keyboard and/or pointing device such as a computer mouse, computer track pad, touch screen, or the like, allows a user to select and instruct network node 101. A user interface can be provided using output 111 and input 113. Output 111 may include a display 112 for displaying data and information for a user, or for interactively displaying a GUI (graphical user interface)

110. A GUI is typically responsive of user inputs entered through input 113 and typically displays images and data on display 112.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 113 such as, for example, a pointing device such as a mouse, and/or with a keyboard. A particular item can function in the same manner to the user in all applications because the GUI provides standard software routines (e.g., the application module 103 can include program code in executable instructions, including such software routines) to handle these elements and report the user's actions.

Computer-readable instructions, for example, program code in application module 103, can include or be representative of software routines, software subroutines, software objects, etc. described herein, are stored on a computer-readable medium and are executable by the processor device (also called a processing unit) 114 of network node 101. The application module 103 can include computer code such as networking code 104, block chain maintenance and execution code 105, validator agent code 106, private block chain maintenance and execution code 107 (for read-only operation), block chain data 118, and smart contract VM 119. A hard drive, CD-ROM, RAM, Flash Memory, and a USB drive are just some examples of articles including a computer-readable medium.

Figure 2:
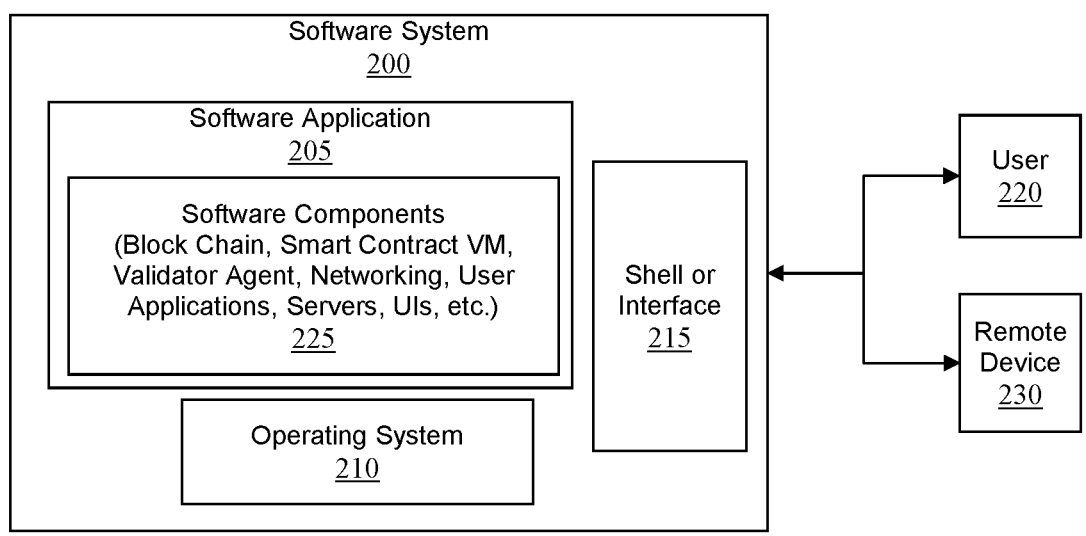
FIG. 2 is a high-level block diagram of a software system, according to embodiments disclosed herein.

FIG. 2 is a high-level block diagram of a software system 200, according to embodiments herein. FIG. 2 illustrates a software system 200, which may be employed for directing the operation of the data-processing systems such as network node 101. Software applications 325, may be stored in memory 102, on removable storage 115, or on non-removable storage 116, and generally includes and/or is associated with a kernel or operating system 210 and a shell or interface 215. One or more application programs may be "loaded" (i.e., transferred from removable storage 115 or non-removable storage 116 into the memory 102) for execution by the network node 101. An application program 205 can include software components 225 such as software modules, software subroutines, software objects, network code, server code, UI code, block chain code, smart contract VM code, validator code, etc. The software system 200 can have multiple software applications each containing software components. The network node 101 can receive user commands and data through interface 215, which can include input 113, output 111, and communications connection 117 accessible by a user 220 or remote device 230. These inputs may then be acted upon by the network node 101 in accordance with instructions from operating system 210 and/or software application 205 and any software components 225 thereof.

Generally, software components 225 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component," "module" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 215 can include a graphical user interface 110 that can display results, whereupon a user 220 or remote device 230 may supply additional inputs or terminate a particular session. In some embodiments, operating system 210 and GUI 110 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 210 and interface 215. The software application 205 can include, for example, software components 225, which can include instructions for carrying out steps or logical operations such as those shown and described herein.

The description herein is presented with respect to embodiments that can be embodied in the context of, or require the use of, a data-processing system such as network node 101, in conjunction with program code in an application module 103 in memory 102, software system 200, or network node 101. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Network nodes 101 and software systems 200 can take the form of or run as virtual machines (VMs) or containers that run on physical machines. As discussed here, a VM can be different from a smart contract VM and the two terms should not be used interchangeably. A VM or container typically supplies an operating environment, appearing to be an operating system, to program code in an application module and software applications 205 running in the VM or container. A single physical computer can run a collection of VMs and containers. In fact, an entire network data processing system including multitude of network nodes 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

Figure 3:
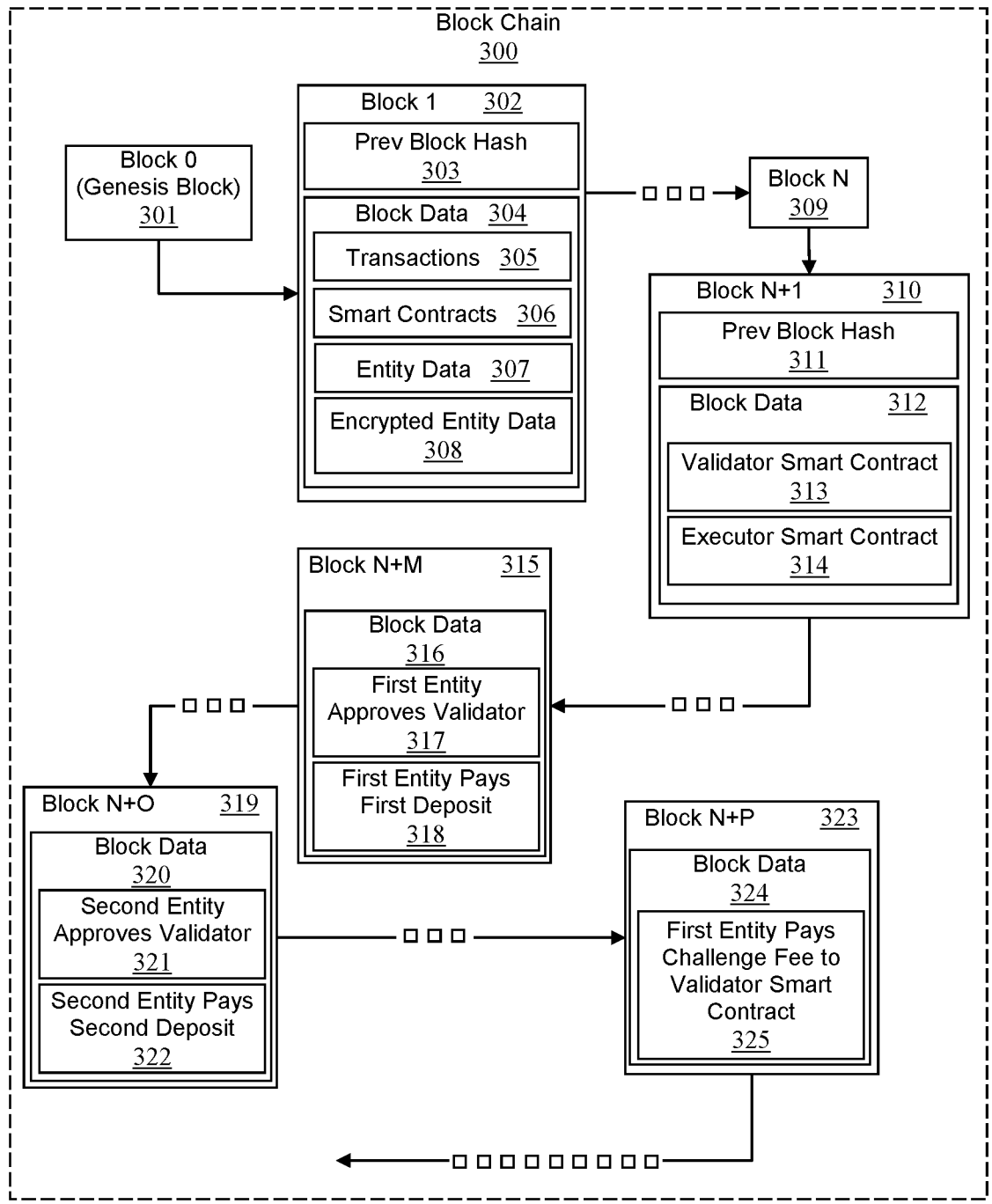
FIG. 3 is a high-level block diagram of a block chain, according to embodiments disclosed herein.

FIG. 3 is a high-level block diagram of a block chain 300, according to embodiments disclosed herein. The very first block, block 0 301, of a block chain is often called the genesis block. A block chain 300, being a sequence of blocks, block 1 302 follows block 0 301. Block 1 302 can contain a previous block hash 303, block data 304, a time stamp, and other information. Block data 304 can include transactions 305, smart contracts 306, entity data 307, encrypted entity data 308, etc. For block 1 302, the previous block hash 303, can be the block hash of block 0 301. In many block chains, the previous block hash is a cryptographic signing, or digital signature, of the previous block. Altering a block on a block chain is immediately discoverable because the altered block's digital signature is different from that stored in the previous block hash of the next block. As such, the next block would also have to be altered to have the correct digital signature, changing its digital signature. It is the chain of digital signatures that makes block chains theoretically immutable because attempting alter one block means that every subsequent block must be altered. Such alteration can be made arbitrarily difficult or unlikely through a signing protocol such as proof-of-work, proof-of-stake, randomly selected trusted party, etc. Those familiar with block chains or cryptocurrencies know of a variety of signing protocols.

Digital signatures can be used to cryptographically sign data such as a previous block, a transaction, user information, etc. Most block chains rely on one of the proven techniques for producing cryptographically secure digital signatures of data such as DSA (digital signature algorithm) developed by the National Institute of Standards and Technology, Elliptic curve DSA which is a variant of DSA, ElGamal, etc. Herein, digital signatures and cryptographic signatures refer to cryptographically secure signatures of data. A digital signature for specific data can be produced from the data and a private key. A digital signature can be verified using the data and a public key. Note that the data must be available in order to verify it using the public key.

Digital signatures are different from data encryption because in data encryption the data is encrypted with an encryption key and therefor unreadable without a decryption key. Digital signatures sign readable data such that the signature can be verified using the signer's public key. Encryption transforms the data into encrypted data that is unreadable without a decryption key. In practice, data is encrypted using one of the proven data encryption techniques such as the Advanced Encryption Standard (AES), Blowfish, Twofish, Serpent, etc. Asymmetric encryption techniques use two keys, often called a private key and a public key, with one key decrypting what the other key encrypts. Symmetric techniques use a single key that both encrypts and decrypts.

Returning to FIG. 3, the block chain has a plethora of blocks. The arrows overlaid by tiny blocks, such as the arrow between block 1 302 and block n 309, indicate that there can be many intervening blocks. Following Block N 309 on the block chain 300 are block N+1, block N+M 315, block N+O 319, and block N+P 323. Block N+1 310 is shown including the block N block hash 311 and block data 312. The block data includes a validator smart contract (VSC) 313 and an executor smart contract (ESC) 314. A validator may have stored the VSC 313, the ESC 314, or both on the block chain 300 at block N+1 310.

Figure 4:
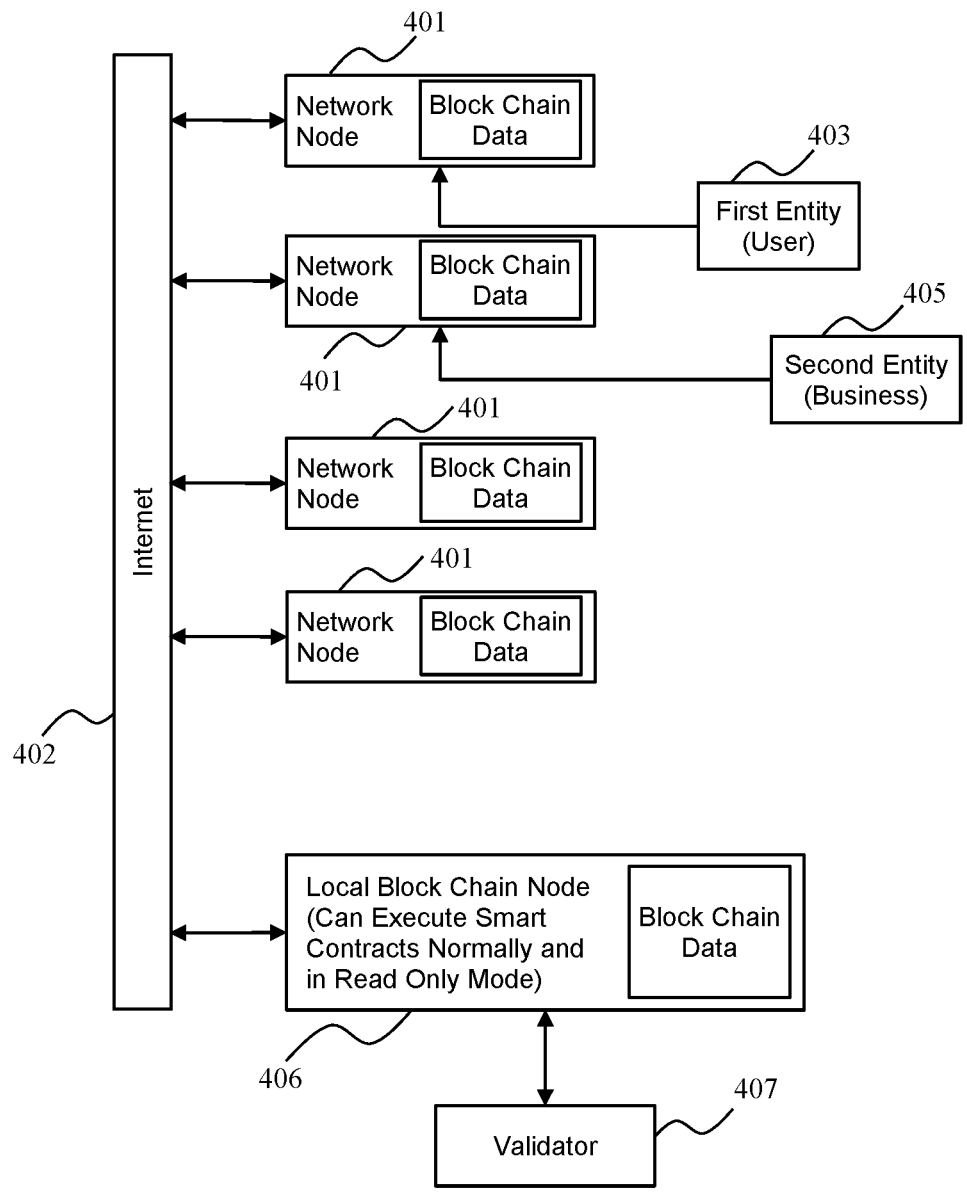
FIG. 4 depicts network nodes maintaining a block chain, according to embodiments disclosed herein.

The block data 316 of block N+M 315 is illustrated as including data, such as transactions, indicating that the first entity approves the validator for settling disputes 317 and that the first entity has paid a first deposit 318 to the ESC 314. The block data 320 of block N+O 315 is illustrated as including data indicating that the second entity approves the validator for settling disputes 321 and that the second entity has paid a second deposit 322 to the ESC 314. The approvals 317, 321 can be recorded by the ESC 314 when an entity accesses the ESC to thereby approve the validator. The deposits can be in the form of crypto currency or crypto token transactions between an entity and the ESC. The block data 324 of block N+P 323 is illustrated as including data indicating that the first entity has paid a challenge fee to the VSC. The challenge fee payment can be in the form of crypto currency or crypto token transactions between the first entity and the VSC FIG. 4 depicts network nodes 401, 406 maintaining a block chain, according to embodiments disclosed herein. The network nodes 401, 406 are illustrated as being able to communicate via the internet 402 and as having block chain data. Block chains are commonly maintained by many network nodes 401, 406 with each maintaining its own version of the block chain. In a trustless environment, the network nodes do not trust each other to have accurate copies of the block chain and therefor process and store each block as it is signed. The block chain maintenance and execution code 105 run by the network nodes 401, 406 can be different programs written to implement a published standard for the block chain. The smart contract VM 119 run by the network nodes 401, 406 can implement a standardized VM specified for the block chain. Note that the smart contract VM 119 can be considered to be executable code within the block chain execution and maintenance code 105 of the network nodes 401. The smart contracts are executable code that can be executed by a smart contract VM. For example, an entity can enter a transaction on the block chain 300 that provides input data to and invokes a method or subroutine within the smart contract. The smart contract VM can run the method or subroutine using the input data and store the result on the block chain. Those practiced in the art of block chain distributed applications (dApps) are familiar with writing, deploying, accessing, transacting with, and interacting with smart contracts.

The first entity 403 is shown interacting with one of the network nodes 401. The second entity 405 is also shown interacting with one of the network nodes 401. By interacting with the network nodes 401, the entities 403, 405 can submit data and transactions for storage on the block chain. Some of the data and transactions stored on the block chain can be processed by smart contracts that store output data on the block chain.

The validator 407 is illustrated as interacting with a local block chain node 406 that can execute smart contracts in read-only mode. In read only mode, the smart contract's executable code can be run and a result obtained without sharing data or transactions with the other network nodes 401. In this manner, the validator can provide a private decryption key as input to a VSC running in read-only mode to thereby decrypt encrypted data stored on the block chain without revealing the private key or revealing the encrypted data in unencrypted form. Similarly, the validator can provide a signing key to a VSC running in read-only mode to thereby produce the digital signature of data without revealing the signing key.

Figure 5:
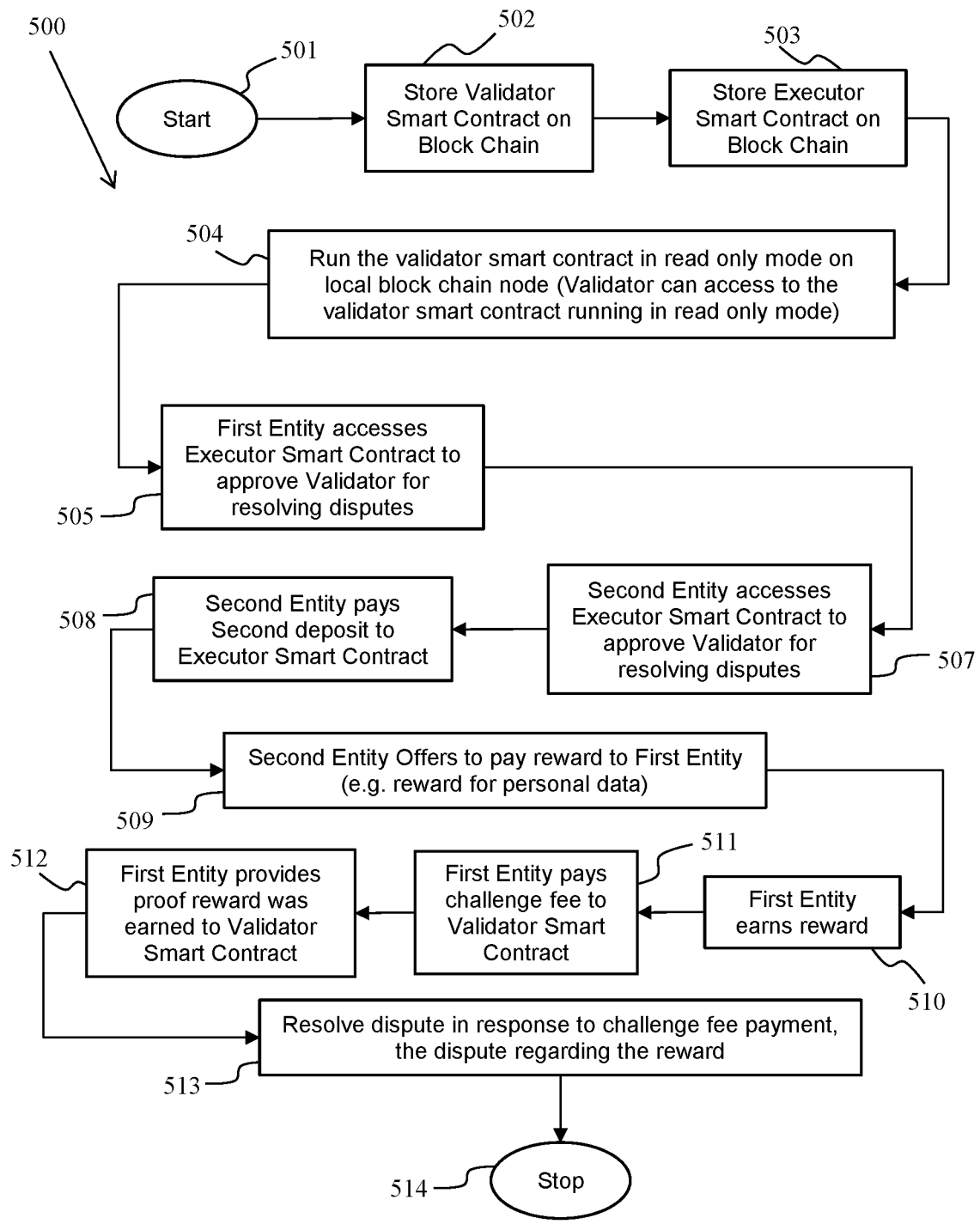
FIG. 5 is a flow chart illustrating an example of a method for providing personal rewards in a trustless system, according to embodiments disclosed herein.

FIG. 5 is a flow chart illustrating an example of a method for providing personal rewards in a trustless system 500, according to embodiments disclosed herein. After the start 501, a validator smart contract (VSC) can be stored on the block chain 502. An executor smart contract (ESC) can also be stored on the block chain 503. The local block chain node can be run 504, thereby providing access to smart contracts running in read-only mode. Using the ESC, the first entity can approve the validator for resolving disputes 505. Using the ESC, the second entity can approve the validator for resolving disputes 507. The second entity can pay a second deposit to the ESC 508. The second entity can offer to pay a reward to the first entity 509. For example, the second entity can offer a reward in return for personal data. The first entity can earn the reward 510 by, for example, providing the requested data to the second entity. The requested data can be encrypted with the second entities public key such that only the second entity can decrypt it. The first entity can pay a challenge fee to the VSC 511, alleging that the reward is unpaid or that the wrong amount was paid. The first entity can provide proof to the VSC that the reward was earned 512. The challenge fee having been paid, the dispute regarding the reward can be resolved 513 before the method completes 514.

Regarding smart contract execution, the inputs to a smart contract method or subroutine can be provided by submitting a transaction with the smart contract for recordation on the block chain. The transaction can include the inputs to a method or subroutine of the smart contract. The method or subroutine can execute, using the inputs, when the transaction is recorded to the block chain. The output of the method or subroutine can be stored on the block chain by the smart contract. Referring to FIG. 4, every network node 401, 406 can independently execute the smart contract method or subroutine and record the output to thereby have an accurate and complete copy of the block chain within a trustless environment.

Figure 6:
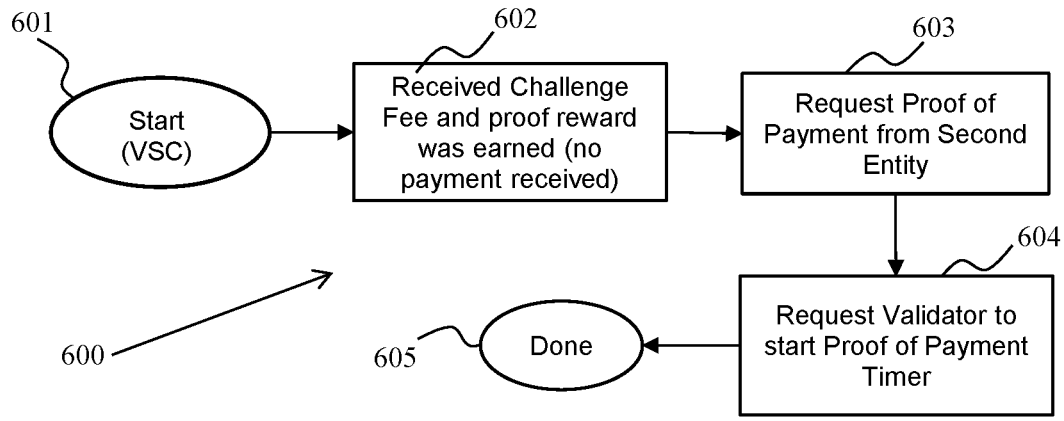
FIG. 6 is a flow chart illustrating an example of a method for a validator smart contract (VSC) responding after receiving a challenge fee (no payment), according to embodiments disclosed herein.

FIG. 6 is a flow chart illustrating an example of a method 600 for a validator smart contract (VSC) responding after receiving a challenge fee (no payment) 600, according to embodiments disclosed herein. Having started 601, the VSC has received the challenge fee and the proof of earning the reward provided by the first entity 602. A request for proof of payment can be sent to the second entity 603. A request to start a proof of payment timer can be sent to the validator 604, requesting that a proof of payment timer be started. Then the method can stop 605. Stopping at this point is an aspect of asynchronous processing, which is typical of smart contracts. Instead of waiting for responses, the method can exit. Any responses to the requests can be processed by other methods or subroutines of the smart contract.

Figure 7:
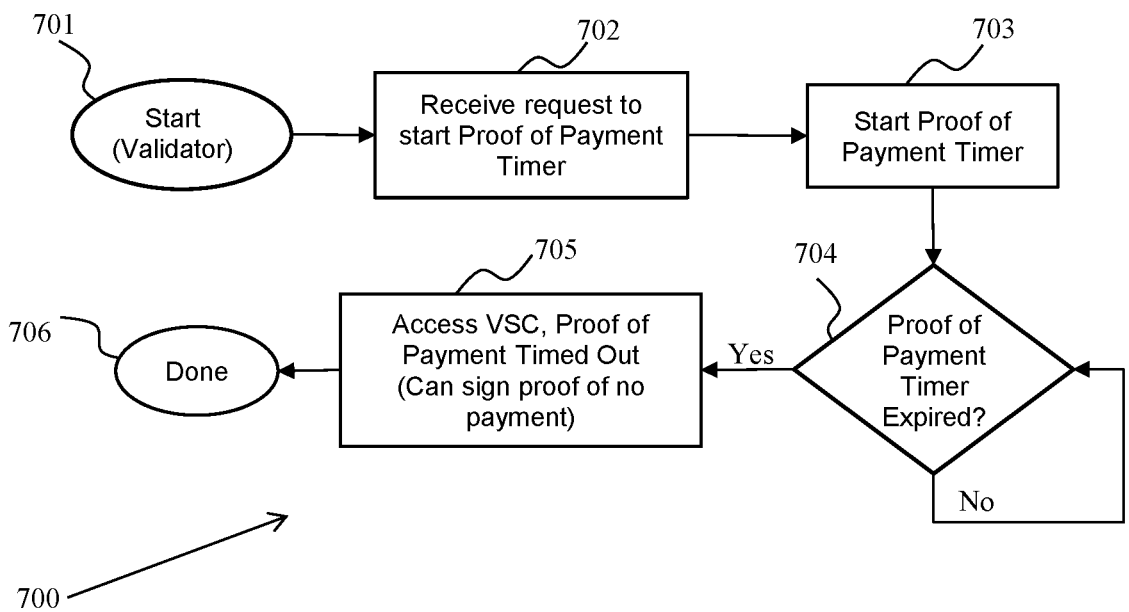
FIG. 7 is a flow chart illustrating an example of a method for a validator running a proof of payment timer, according to embodiments disclosed herein.

FIG. 7 is a flow chart illustrating an example of a method 700 for a validator running a proof of payment timer, according to embodiments disclosed herein. After starting 701, the validator receives a request to start a proof of payment timer 702. The request may have been sent at block 604, described above. The proof of payment timer is started 703. Decision block 704 indicates waiting for the timer to expire 704. Looping until a condition is satisfied, called a busy wait, is shown herein for simplicity with the expectation that a more modern technique such as pausing or waiting for an alarm or signal will actually be implemented. After the timer expires, the VSC can be informed that the deadline for providing proof of payment has passed 705 before the method completes 706. As discussed above, the VSC can be informed when a transaction is recorded on the block chain.

Figure 8:
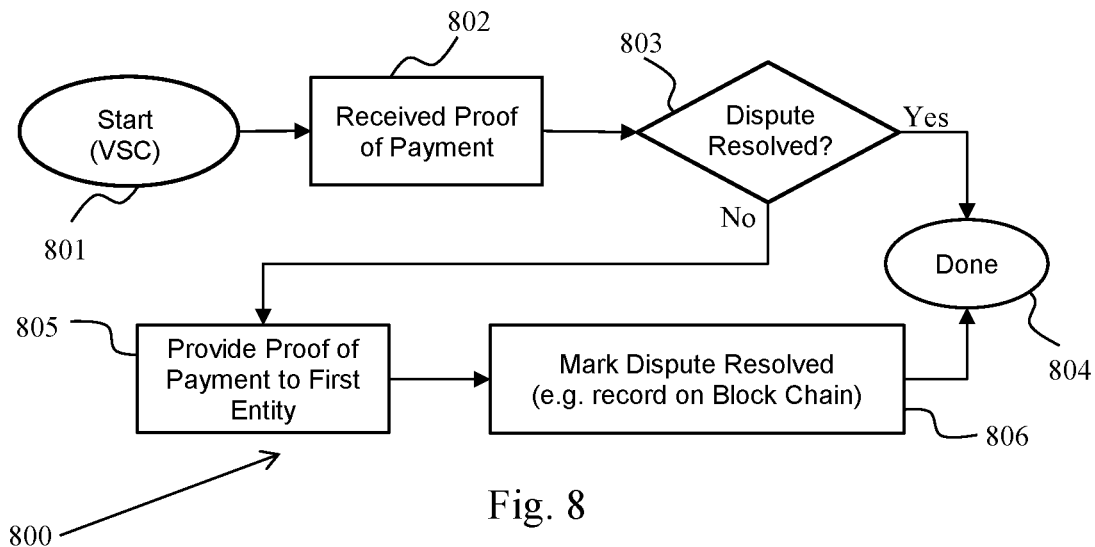
FIG. 8 is a flow chart illustrating an example of a method for a VSC responding after receiving proof of payment, according to embodiments disclosed herein.

FIG. 8 is a flow chart illustrating an example of a method 800 for a VSC responding after receiving proof of payment, according to embodiments disclosed herein. Having started 801, the VSC has received proof of payment 802. If the dispute is already resolved 803, the method completes 804. Otherwise, the proof of payment can be provided to the first entity 805. The dispute can be marked as resolved 806 before the method completes 804.

Figure 9:
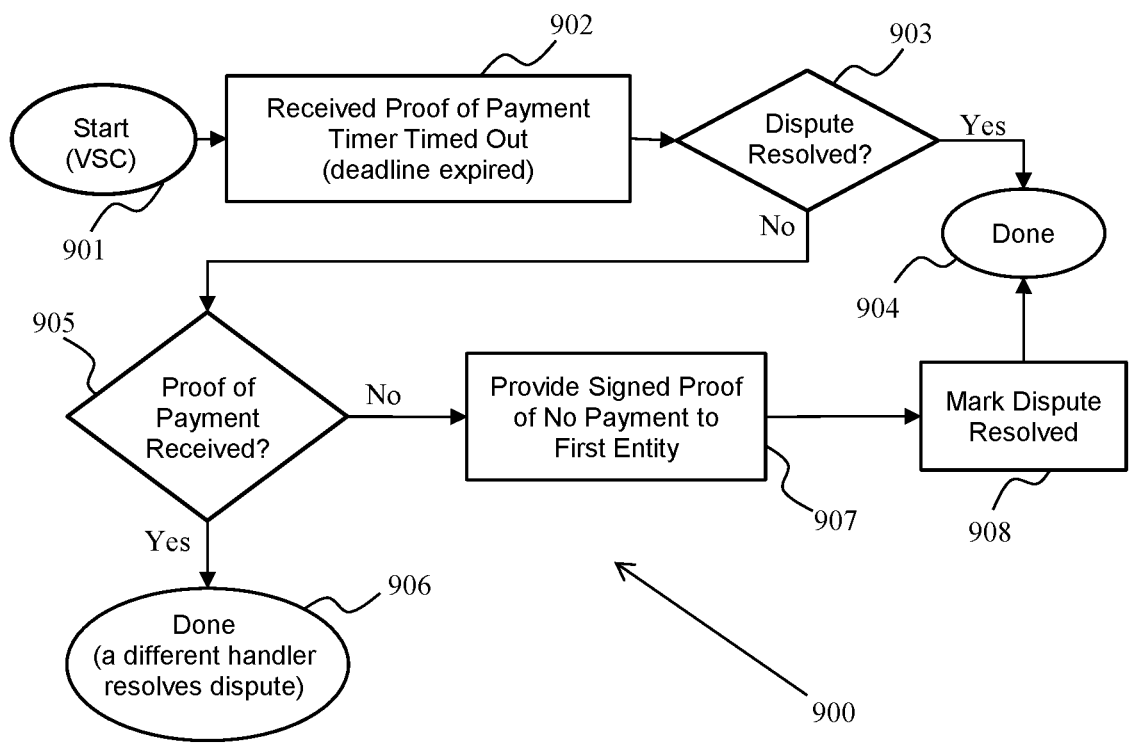
FIG. 9 is a flow chart illustrating an example of a method for a VSC responding after receiving a proof of payment timer timed out (the deadline expired), according to embodiments disclosed herein.

FIG. 9 is a flow chart illustrating an example of a method 900 for a VSC responding after receiving a proof of payment timer timed out (the deadline expired), according to embodiments disclosed herein. Having started 901, the VSC has received an input indicating the proof of payment timer timed out 902. This proof may have been provided at block 705, discussed above. If the dispute is already resolved 903, the method completes 904. Otherwise, the method can determine if proof of payment has been received 905. If proof of payment has been received, the method is done 906. Otherwise, signed proof of no payment can be provided to the first entity 907 before the method completes 908. The proof of no payment can be signed by the validator.

Figure 10:
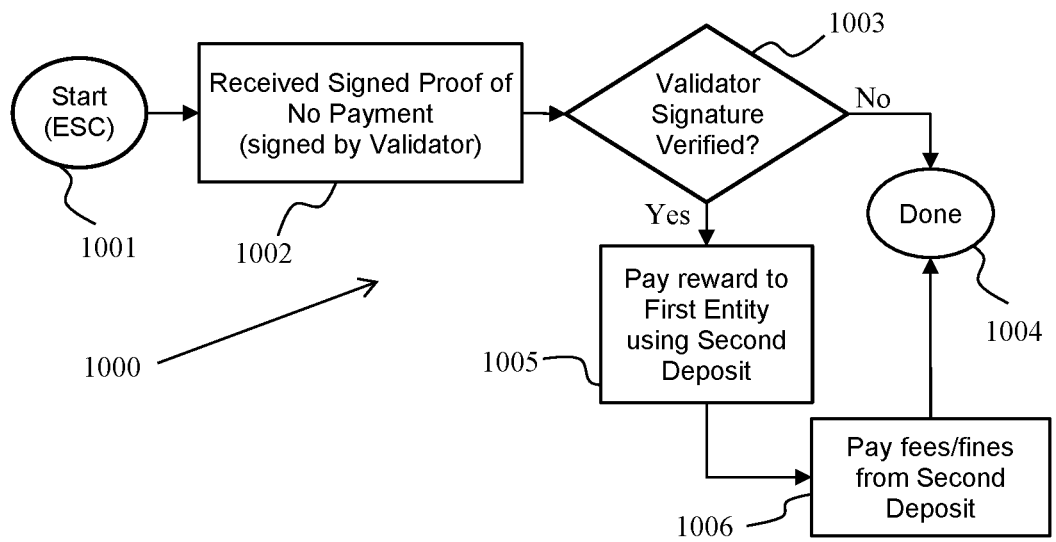
FIG. 10 is a flow chart illustrating an example of a method for an executor smart contract (ESC) responding after receiving a signed proof of no payment, according to embodiments disclosed herein.

FIG. 10 is a flow chart illustrating an example of a method 1000 for an executor smart contract (ESC) responding after receiving a signed proof of no payment, according to embodiments disclosed herein. Having started 1001, the ESC has received signed proof of no payment 1002. Verifying the validator signature 1003 ensures that the validator did sign the proof of no payment. If the signature is not verified as the validator's signature, the method can stop 1004. Otherwise, the ESC can pay the reward to the first entity using the second deposit 1005. The ESC can also pay penalties and fines from the second deposit 1006 before the method completes 1004. The penalties and fines can include reimbursing the challenge fee, a processing fee, and penalties paid to the first entity or validator.

Figure 11:
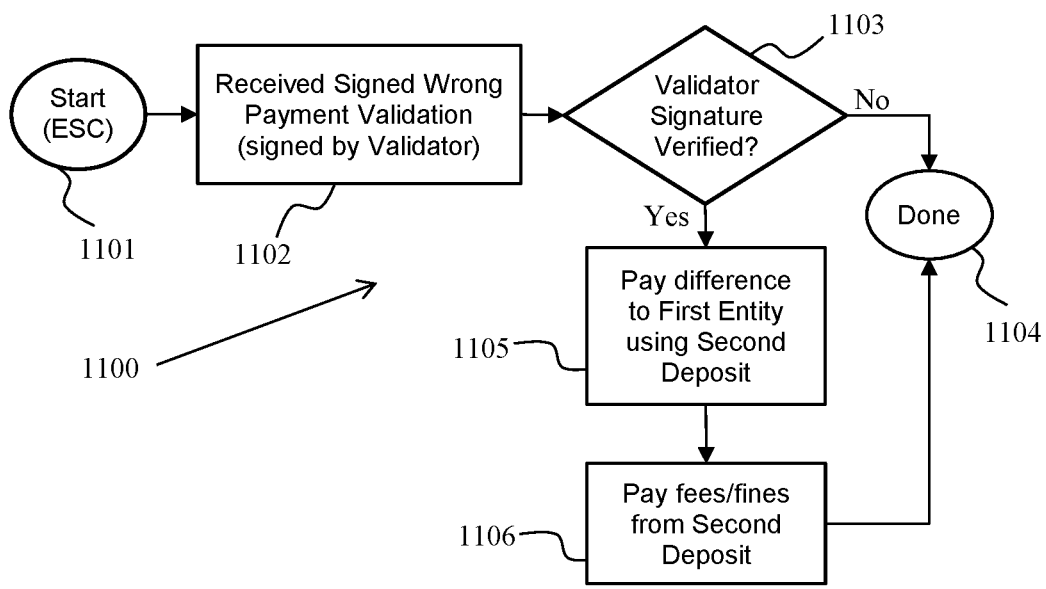
FIG. 11 is a flow chart illustrating an example of a method for an ESC responding after receiving a signed wrong payment validation, according to embodiments disclosed herein.

FIG. 11 is a flow chart illustrating an example of a method 1100 for an ESC responding after receiving a signed wrong payment validation, according to embodiments disclosed herein. Having started 1101, the ESC has received a signed wrong payment validation 1102. The validator may have signed the signed wrong payment validation. If the validator signature is invalid 1103, the method completes 1104. Otherwise the ESC can pay the difference to the first entity from the second deposit 1105. The difference can be the amount paid subtracted from that which should have been paid. The ESC can also pay penalties and fines from the second deposit 1106 before the method completes 1104.

Figure 12:
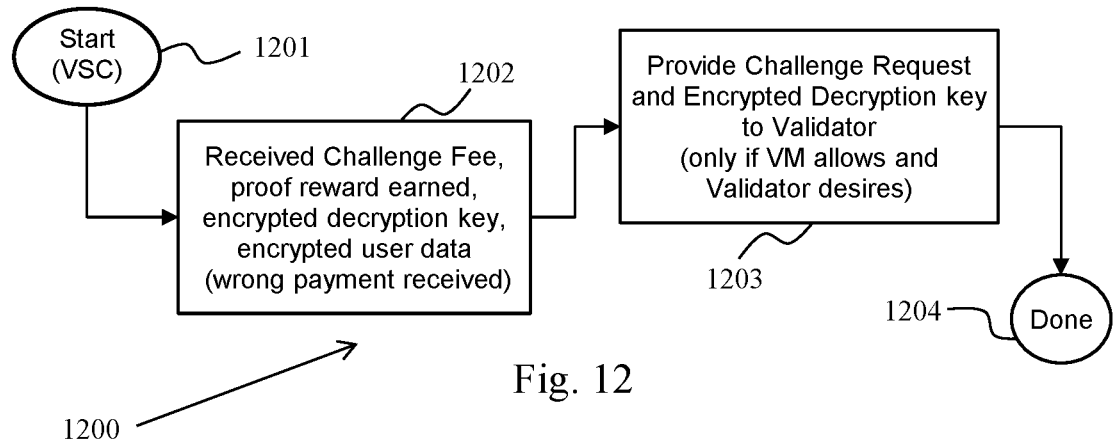
FIG. 12 is a flow chart illustrating an example of a method for a VSC responding after receiving a challenge fee (wrong payment), according to embodiments disclosed herein.

FIG. 12 is a flow chart illustrating an example of a method 1200 for a VSC responding after receiving challenge fee (wrong payment), according to embodiments disclosed herein. Having started 1201, the VSC has received input that can include the challenge fee, proof that the reward was earned, an encrypted decryption key, and encrypted user data 1202. The encrypted decryption key may be encrypted with a public key, the validator having the corresponding private key. The VSC can provide a challenge request and the encrypted decryption key to the validator 1203 before the method completes 1204. A smart contract VM can have the capability to send off block chain messages and can thereby provide the challenge request. The validator can monitor all VSC transactions and thereby be provided with the challenge request.

Figure 13:
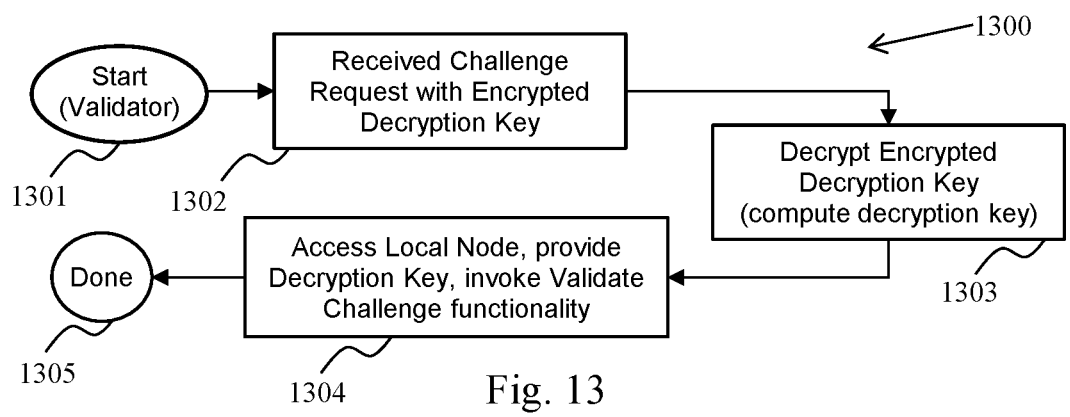
FIG. 13 is a flow chart illustrating an example of a method for a validator responding after receiving a challenge request with an encrypted decryption key, according to embodiments disclosed herein.

FIG. 13 is a flow chart illustrating an example of a method 1300 for a validator responding after receiving a challenge request with an encrypted decryption key, according to embodiments disclosed herein. After starting 1301, the validator can receive the challenge request and encrypted decryption key from the VSC 1302. The decryption key can be computed 1303 because the validator has the private key matching the public key that was used for encrypting the decryption key to produce the encrypted decryption key. The local block chain node can be accessed and the VSC's "validate challenge" functionality invoked and the decryption key provided 1304 before the method is done 1305. Here, the VSC running in read-only mode receives the decryption key.

Figure 14:
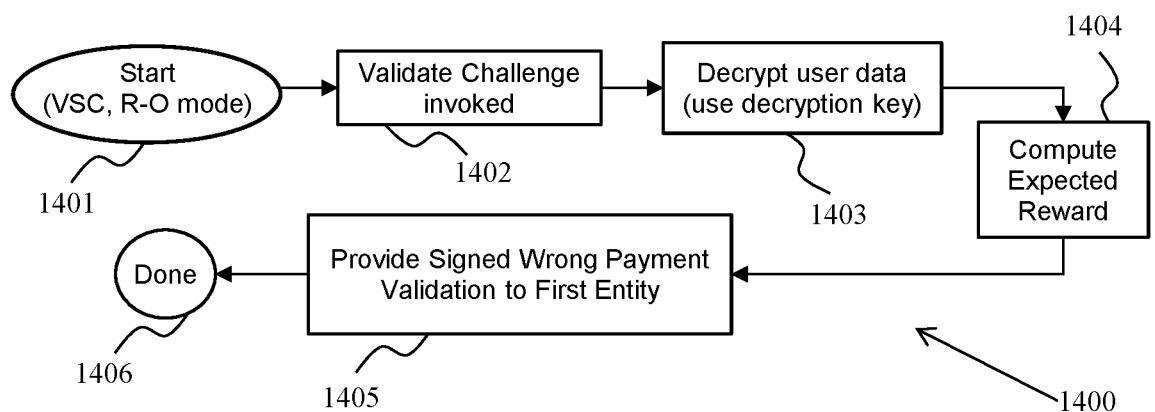
FIG. 14 is a flow chart illustrating an example of a method for a VSC responding after receiving an invocation of a validate challenge method or routine, according to embodiments disclosed herein.

FIG. 14 is a flow chart illustrating an example of a method 1400 for a VSC responding after receiving an invocation of a validate challenge method or routine, according to embodiments disclosed herein. Having started 1401, the VSC's validate challenge has been invoked 1402 and the VSC is running in read only mode. The encrypted user data can be decrypted using the decryption key provided by the validator 1403. The expected reward can be calculated 1404. using the user data. A signed wrong payment validation can be provided to the first entity 1405 before the method is done 1406. The signed wrong payment validation can be signed by the validator and can include the expected reward.

Figure 15:
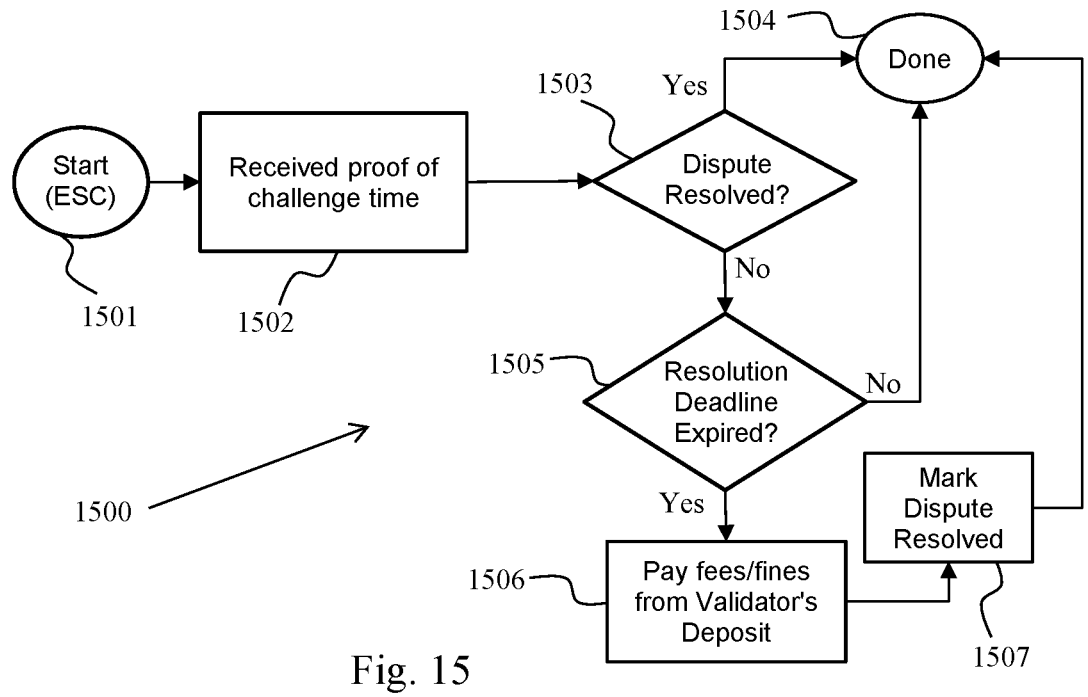
FIG. 15 is a flow chart illustrating an example of a method for an ESC responding after receiving a proof of challenge time, according to embodiments disclosed herein.

FIG. 15 is a flow chart illustrating an example of a method 1500 for an ESC responding after receiving a proof of challenge time, according to embodiments disclosed herein. Having started 1501, the ESC received a proof of challenge time 1502. The proof of challenge time can be provided by the first entity to the ESC when the validator fails to resolve a dispute within a specified time. If the dispute is already resolved 1503 the method can be done 1504. Otherwise, if the specified time has not elapsed since the challenge was issued, the resolution deadline therefor not expired, the method can stop 1504. If the resolution deadline has expired 1505, then the ESC can pay fees and fines from the validator's deposit to the first entity 1506. The dispute can be marked as resolved 1507 before the method is done 1504. The fines and fees can include the reward amount, processing fee reimbursement, challenge fee reimbursement, punitive amounts, etc. for example, as a penalty the entirety of the validator deposit can be paid to the first entity.

Figure 16:
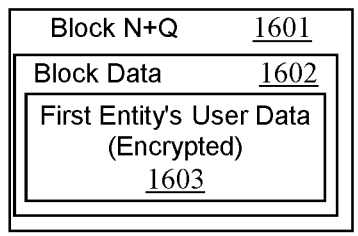
FIG. 16 is a high-level block diagram of a block of a block chain storing the first entity's encrypted user data, according to embodiments disclosed herein.
Figure 17:
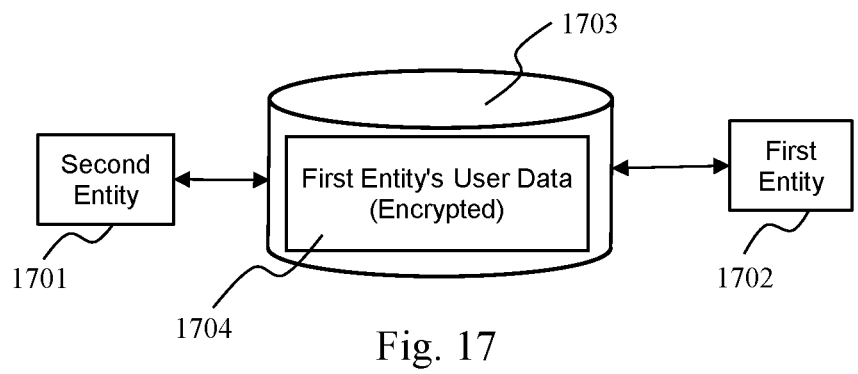
FIG. 17 is a high-level block diagram of a data store storing the first entity's encrypted user data, according to embodiments disclosed herein.

FIG. 16 is a high-level block diagram of a block of a block chain storing the first entity's user data, according to embodiments disclosed herein. Block N+Q 1601 can include block data 1602 that includes the first entity's user data in encrypted form 1603 or can include a hash pointer to that data stored in an open storage like IPFS or similar. As discussed above, blocks can contain other fields and data such as time stamps, previous block hashes, etc. FIG. 17 is a high-level block diagram of a data store 1703 storing the first entity's user data 1704 in encrypted form, according to embodiments disclosed herein. The first entity 1702 can store the first entity's user data 1704 and the second entity 1701 can access it. The second entity 1701 needs a decryption key to decrypt and read the first entity's user data 1704. That decryption key and the location of the data can be provided to the second entity 1701 to thereby earn the reward.

Figure 18:
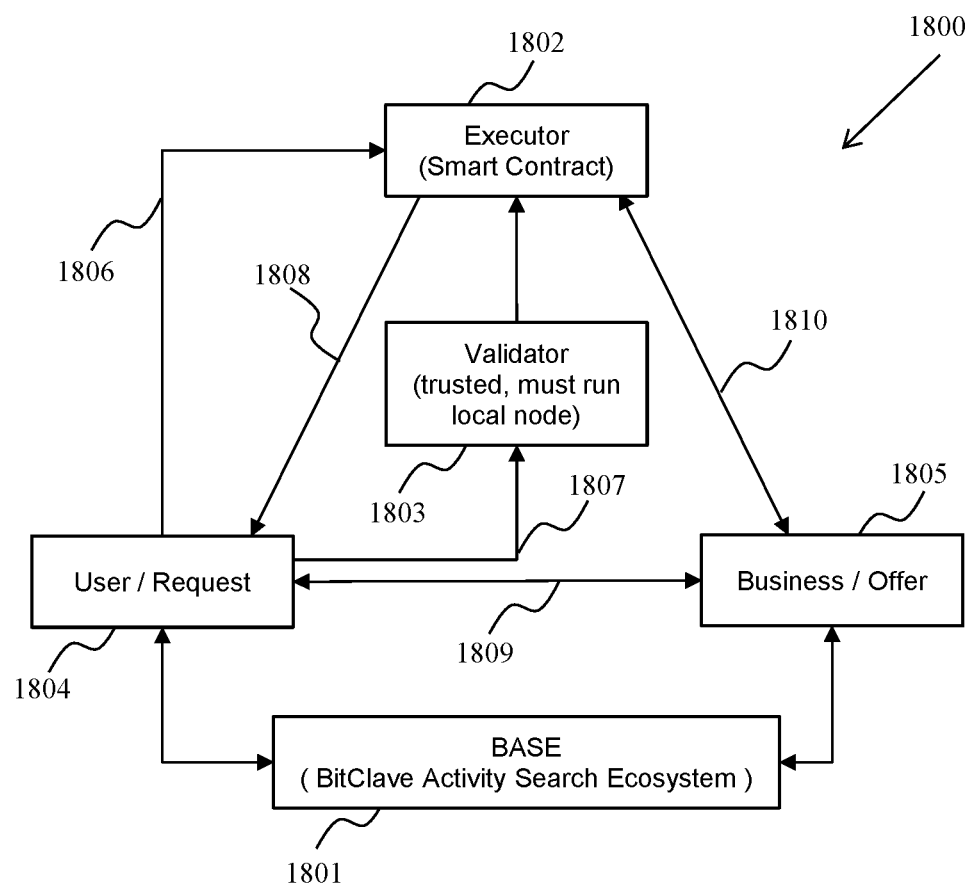
FIG. 18 is a high-level block diagram of main actors and their roles in the context of a BitClave Active Search Ecosystem, according to embodiments disclosed herein.

FIG. 18 is a high-level block diagram of main actors and their roles in the context of a BitClave ActiveSearch Ecosystem (BASE) 1801, according to embodiments disclosed herein. BASE 1801 can store encrypted data. BASE 1801 provides APIs for data sharing and users 1804 can decide to whom they provide their data. The business 1805 can provide personalized offers and rewards 1809 to user 1804, and can provide a deposit 1810 to the Executor 1802 to participate in the ecosystem. The user 1804 can challenge the validator 1806, can receive payments from and may make deposits to the executor 1808, can share personal data 1809 with the business 1805, and can challenge 1807 the business 1805.

The validator 1803 is the entity that can be engaged for disputes and in some embodiments can be engaged only for disputes. The validator 1803 can verify that a reward is properly paid. The validator's 1803 validation function can be open, viewable to all, and hence trusted. If the validator 1803 finds out that the reward is not paid or wrong amount is paid, it can communicate to the executor 1802 and the executor can transfer at least some of the business's deposit to the user. In some embodiments, the validator can be activated only by the user's request. The user can pay a challenge fee to the validator to incentivize the validator and to prevent abuse of "too many challenges". The validator is a trusted and known entity comparable to the block signer in many block chains. The validator needs to be verified and in case of "misbehavior" can be sued. As with block chains, such as proof of stake block chains, a single algorithm should not be expected for validators. There are many decisions to be implemented with respect to work in encrypted domains, validators can therefore specialize on specific problems. A validator can be, or must be, registered with the executor 1802 and agreed to by both the user and the business. Each validator can see only partial personal data and as such is not an entity that knows all about all users.

The executor 1802 can be a smart contract that can receive deposits from the validator, the user, and the business. The executor can transfer the validator's deposit if given proof that the validator misbehaved. The executor 1802 can transfer the business's deposit given proof, signed by the validator, that the business misbehaved. The executor can be implemented as a traditional smart contract as it does not need to access encrypted data. The executor can judge contracts based on "signed proofs" provided by trusted validators. In some embodiments, no fees need to be collected by the executor because it is just a smart contract that is executed on a block chain. Traditional block chain fees may apply, but nothing more may be needed due to the executor's role. This is different from the validator that operates off chain and interacts with the on-chain validator smart contract.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. Typically, the computer readable instructions, when executed on one or more processors, implements a method. The instructions may reside in various types of computer readable media. In this respect, another aspect of the present invention concerns a programmed product, comprising a computer readable medium tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method comprising:
   storing, on a block chain, a validator smart contract and an executor smart contract;
   storing, on the block chain, a first record that indicates that a first entity approves a validator for resolving a dispute and has paid a first deposit to the executor smart contract;
   storing, on the block chain, a second record that indicates that a second entity approves the validator for resolving the dispute and has paid a second deposit to the executor smart contract;
   storing, on the block chain, an encrypted decryption key that has been provided to the validator smart contract;
   storing, on the block chain, a challenge request that includes a challenge fee and encrypted user data; and
   storing, on the block chain, a validation that is cryptographically signed by the validator,
   wherein:
      the block chain is maintained by a plurality of network nodes;
      decrypting the encrypted decryption key produces a decryption key;
      producing the validation includes inputting the decryption key to the validator smart contract to thereby decrypt the encrypted user data without writing the decryption key to the block chain;
      the validator is an entity that runs a local node of the block chain in read only mode to thereby use the validator smart contract and the decryption key to produce the validation without storing the decryption key on the block chain; and
      an input data provided to the validator smart contract while the validator smart contract is running in read only mode is not provided to or recorded on the block chain.

2. The method of claim 1 wherein the validation smart contract is configured to receive a proof that proves that the first entity has supplied data to the second entity and thereby earned a reward, and to mark, on the block chain, that the dispute over the reward is resolved.

3. The method of claim 2, wherein:
   the validator smart contract is configured to receive a proof of payment indicating that the reward has been paid to the first entity; and
   the validator smart contract is configured to record, on the block chain and in response to receiving the proof of payment before a deadline, that the dispute is resolved.

4. The method of claim 2, wherein:
   the validator smart contract is configured to record on the block chain, after expiration of a deadline, a proof of no payment because a proof of payment has not been received by the validator smart contract before the deadline; and
   the executor smart contract is configured to pay the reward from the second deposit in response to receiving the proof of no payment.

5. The method of claim 4 wherein the validator cryptographically signs the proof of no payment and wherein the executor smart contract cryptographically verifies the proof of no payment.

6. The method of claim 2 wherein
   the executor smart contract is configured to pays an expected reward to the first entity from the second deposit in response to receiving the validation, the validation indicating the expected reward.

7. The method of claim 6 wherein the executor smart contract is configured to cryptographically verify the validation.

8. The method of claim 2 further comprising:
   storing, on the block chain, a validator's deposit paid to the executor smart contract before the first entity paid the challenge fee to the validator smart contract; and
   wherein the executor smart contract is configured to resolves the dispute by paying the validator's deposit to the first entity, the first entity having provided proof of a challenge time, and the executor smart contract verifying that a resolution deadline expired before resolution of the dispute by the validator.

9. The method of claim 2 wherein the first entity provides the data to the second entity by storing the data on the block chain as encrypted data.

10. The method of claim 2 wherein the first entity provides the data to the second entity by storing the data as encrypted data in a data store accessible by the second entity.

11. A non-transitory computer storage medium storing computer readable instructions, that when executed on one or more processors, implements a method comprising:
    storing, on a block chain, a validator smart contract and an executor smart contract;
    storing, on the block chain, a first record that indicates that a first entity approves a validator for resolving a dispute and has paid a first deposit to the executor smart contract;
    storing, on the block chain, a second record that indicates that a second entity approves the validator for resolving the dispute and has paid a second deposit to the executor smart contract;
    storing, on the block chain, an encrypted decryption key that has been provided to the validator smart contract;
    storing, on the block chain, a challenge request that indicates receipt by the validator smart contract of a challenge fee and encrypted user data; and
    storing, on the block chain, a validation that is cryptographically signed by the validator, wherein:
- the block chain is maintained by a plurality of network nodes;
- decrypting the encrypted decryption key produces a decryption key;
- producing the validation includes inputting the decryption key to the validator smart contract to thereby decrypt the encrypted user data without writing the decryption key to the block chain;
- the validator is an entity that runs a local node of the block chain in read only mode to thereby use the validator smart contract and the decryption key to produce the validation without storing the decryption key on the block chain; and
- an input data provided to the validator smart contract while the validator smart contract is running in read only mode is not provided to or recorded on the block chain.

12. The non-transitory computer storage medium storing computer readable instructions of claim 11 wherein the validation smart contract is configured to receive a proof that proves that the first entity has supplied data to the second entity and thereby earned a reward, and to mark, on the block chain, that the dispute over the reward is resolved.

13. The non-transitory computer storage medium storing computer readable instructions of claim 12:
- the validator smart contract is configured to record, on the block chain, that the dispute is resolved in response to receiving, before a deadline expires, a proof of payment indicating that the reward has been paid to the first entity.

14. The non-transitory computer storage medium storing computer readable instructions of claim 12, wherein the method further comprises:
- requesting, from the second entity, a proof of payment indicating the reward has been paid; and
- after expiration of a deadline, recording a proof of no payment on the block chain, the proof of payment having not been received by the validator smart contract before the deadline, wherein:
- the executor smart contract pays the reward from the second deposit in response to receiving the proof of no payment;
- the validator cryptographically signs the proof of no payment; and
- the executor smart contract cryptographically verifies the proof of no payment.

15. The non-transitory computer storage medium storing computer readable instructions of claim 12:
- wherein the executor smart contract pays the first entity from the second deposit in response to receiving the validation; and
- wherein the executor smart contract cryptographically verifies the validation.

16. The non-transitory computer storage medium storing computer readable instructions of claim 12:
- storing, on the blockchain, a record that indicates a validator's deposit paid to the executor smart contract before the first entity paid the challenge fee to the validator smart contract; and
- wherein the executor smart contract is configured to resolve the dispute by paying the validator's deposit to the first entity, the first entity having provided proof of a challenge time, the executor smart contract verifying that a resolution deadline expired before resolution of the dispute by the validator.

17. The non-transitory computer storage medium storing computer readable instructions of claim 12, wherein the first entity provides the data to the second entity by storing the data on the block chain as encrypted data.

18. The non-transitory computer storage medium storing computer readable instructions of claim 12 wherein the first entity provides the data to the second entity by storing the data as encrypted data in a data store accessible by the second entity.

* * * * *